3,449,356
2-[(HALOPHENOXY)METHYL]-2-IMIDAZOLINES
Halbert C. White, Midland, Mich., assignor to The Dow Chemical Company, Midland, Mich., a corporation of Delaware
No Drawing. Filed Apr. 4, 1967, Ser. No. 628,302
Int. Cl. C07d 49/34; A61k 27/00
U.S. Cl. 260—309.6                    7 Claims

ABSTRACT OF THE DISCLOSURE

New 2[(halophenoxy)methyl] - 2 - imidazoline compounds such as 2-[(4-amino-3-chlorophenoxy)methyl]-2-imidazoline, and their pharmaceutically-acceptable salts such as the mono- and dihydrochloride which are antidepressants.

This invention is concerned with haloaryloxyimidazolines and is particularly directed to 2-[(halophenoxy)methyl]-2-imidazolines such as 2-[(4-amino-3-chlorophenoxy)methyl]-2-imidazoline and the pharmaceutically acceptable salts thereof corresponding to the formula:

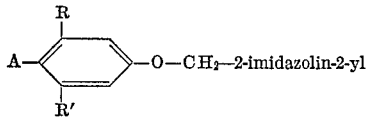

In the present specification and claims, A represents acetamido or amino, R represents trifluoromethyl, chlorine or bromine and R' represents hydrogen, trifluoromethyl, chlorine or bromine. The term "pharmaceutically-acceptable salt" as herein employed refers to non-toxic salts of the halophenoxymethylimidazolines. Such pharmaceutically-acceptable salts include non-toxic acid addition salts with inorganic acids such as hydrochloric, hydrobromic, sulfuric or phosphoric acid, or with organic acids such as acetic, succinic, malic, maleic, tartaric or citric acid or with organic sulfonic acids such as methanesulfonic or p-toluenesulfonic acid. The novel compounds are crystalline solids which are of varying degrees of solubility in organic solvents such as 1,2-dichlorobenzene, methylene chloride and alcohols and only slightly soluble in water. The pharmaceutically-acceptable salts of the novel compounds such as 2-[(4-amine-3,5-dichlorophenoxy)methyl]-2-imidazoline dihydrochloride are soluble in water and slightly soluble in organic solvents such as acetone, benzene and alcohols.

The novel compounds corresponding to the above formula wherein A is amino are useful for administration to laboratory animals in studying the behavior thereof and in studying drug effects on the central and peripheral nervous system, and are particularly useful as antidepressants. The compounds wherein R' is hydrogen have little or no pharmacological activity in other areas, and are the preferred compounds for antidepressant use. For such uses, the preferred form of the halophenoxymethylimidazoline compounds is a pharmaceutically-acceptable salt thereof and the compounds are preferably employed in the form of their dihydrochloride salts. The compounds wherein A is acetamido are useful as intermediates in the preparation of the compounds wherein A is amino. The intermediates are preferably employed as the hydrochloride salts. Other salts, and particularly the tosylate (p-toluenesulfonate), can also be used in the preparation and purification of the halophenoxymethylimidazolines, and can be converted to the preferred hydrochloride salts.

The compounds of the invention wherein A is acetamido are prepared by the reaction of a substituted phenoxyacetonitrile with ethylenediamine p-toluenesulfonate to form a halophenoxymethylimidazoline p-toluenesulfonate salt, and the subsequent hydrolysis of the halophenoxymethylimidazoline p-toluenesulfonate salt in aqueous base to liberate the compound as a free base. The substituted phenoxyacetonitrile starting material can be prepared by known procedures, for example, by mixing a substituted acetanilide such as 2-chloro-4-hydroxyacetanilide and chloroacetonitrile with potassium carbonate in an inert organic solvent, such as dimethylsulfoxide, and heating the mixture at a temperature of about 70°–90° C. for about 0.5–3 hours. The substituted phenoxyacetonitrile can be separated by diluting the mixture with water, followed by extraction with methylene chloride and evaporation of the methylene chloride extract.

The reaction proceeds with the evolution of ammonia when the substituted phenocyacetonitrile and the ethylenediamine p-toluenesulfonate are mixed together, preferably in an inert organic solvent as a reaction medium. Representative and suitable inert organic solvents which can be employed as reaction media include alkyl benzenes such as o, m, and p-xylene, and halobenzenes such as 1,2-dichlorobenzene. The reaction is preferably carried out under an inert atmosphere by passing nitrogen through the mixture to carry off ammonia of reaction. The reaction proceeds readily at temperatures from about 150° to about 180° C. and is preferably carried out under reflux at the boiling temperature of the reaction mixture. The halophenoxymethylimidazoline product precipitates in the reaction mixture as its p-toluenesulfonate salt, and the salt can be separated by conventional methods as filtration, centrifugation or decantation. The product can be obtained by hydrolysis of the salt in aqueous base. The free base halophenoxymethylimidazoline is then separated by extraction with an organic solvent such as methylene chloride or chloroform, followed by evaporation of the solvent. The product can be purified by conventional methods such as recrystallization, or it can be converted to a pharmaceutically-acceptable salt.

The compounds of the invention wherein A is amino are prepared by the hydrolysis of the compounds wherein A is acetamido. The hydrolysis is carried out in an aqueous medium containing excess acid, generally at least about 2 molar proportions of acid being employed for each molar proportion of starting material. The acid employed is preferably one which is capable of forming a pharmaceutically-acceptable salt with the halophenoxymethylimidazoline compound. The reaction proceeds when a halophenoxymethylimidazoline corresponding to the above formula wherein A is acetamido is mixed with excess aqueous acid, preferably hydrochloric acid, and proceeds at temperatures from about 90° to about 110° C. The product precipitates in the reaction mixture as a pharmaceutically-acceptable salt. The product can be separated by conventional procedures such as filtration and washing. The product can be further purified by conventional methods such as recrystallization, or it can be converted to the free base or to another pharmaceutically-acceptable salt.

The pharmaceutically-acceptable salts of the halophenoxymethylimidazoline compounds can be prepared by dissolving the free base in a minimal amount of alcohol and adding an alcohol solution of an acid such as hydrochloric acid, hydrobromic acid, malic acid, maleic acid or succinic acid until precipitation of the corresponding salt is complete. In the case of the compounds wherein A is amino the mono-acid salt can be prepared by adding one molar equivalent of acid. The diacid salt can be similarly prepared by using at least two molar equivalents of acid for each equivalent of free base. The salt can further be purified by recrystallization or converted to the free base by hydrolysis.

3

The free base halophenoxymethylimidazoline can be prepared by hydrolysis of the salt in aqueous base. The salt is mixed with at least a molar equivalent of sodium hydroxide in aqueous solution, after which the free base can be separated by extraction with a chlorinated hydrocarbon solvent. The solvent can be removed by conventional methods such as evaporation or distillation and the halophenoxymethylimidazoline can be purified by methods such as recrystallization.

In preparing the compounds of the invention, wherein A is acetamido, a substituted phenoxyacetonitrile, ethylenediamine p-toluenesulfonate and an inert organic solvent, preferably 1,2-dichlorobenzene, are mixed together. The exact proportions of the reactants to be employed are not critical, some of the desired product being obtained when the reactants are combined in any proportions. However, the reaction consumes the reactants in equimolar proportions and the use of the reactants in such proportions is preferred. Nitrogen is passed through the mixture while the mixture is heated at a temperature within the reaction temperature range for about 1 to 10 hours. In a convenient procedure, the reaction vessel is vented to a trap containing aqueous hydrochloric acid to react with the ammonia of reaction. The reaction mixture is then cooled and filtered. The halophenoxymethylimidazoline p-toluenesulfonate filter cake can be further purified by recrystallization or it can be converted to the free base by hydrolysis in aqueous base.

In preparing the compounds wherein A is amino, a halophenoxymethylimidazoline of the invention wherein A is acetamido is conveniently converted to the hydrochloride salt by treatment with alcoholic or gaseous hydrogen chloride. The salt is then mixed with an excess of aqueous hydrochloric acid and the mixture is heated for about 0.5 to 3 hours at a temperature within the reaction temperature range. The dihydrochloride salt product is separated by filtration. The product can be further purified or it can be converted to the free base by hydrolysis in aqueous base.

The following examples illustrate the invention but are not to be construed as limiting the same.

EXAMPLE 1

4-acetamido-3-chlorophenoxyacetonitrile (17.5 grams; 0.083 mole) is mixed with ethylenediamine p-toluenesulfonate (20 grams; 0.086 mole) and 100 milliliters of 1,2-dichlorobenzene. Nitrogen is passed through the mixture while the mixture is heated at the boiling temperature under reflux for about 1 hour. The ammonia of reaction is collected by passing the exit gases through a gas scrubber and the ammonia of reaction is neutralized with dilute aqueous hydrochloric acid. The reaction mixture is cooled and the solvent is decanted off to obtain 2-[(4-acetamido-3-chlorophenoxy)methyl]-2 - imidazoline p-toluenesulfonate, having a molecular weight of 440, as a residue. The 2-[(4-acetamido -3 - chlorophenoxy)methyl]-2-imidazoline p-toluenesulfonate is dissolved in water and the solution is made basic by the addition of about 20 milliliters of aqueous 5 normal sodium hydroxide. The mixture is extracted with methylene chloride to separate the 2-[(4-acetamido-3-chlorophenoxy)methyl]-2-imidazoline as a solution of the free base in methylene chloride. The methylene chloride extract is acidified by the addition of excess gaseous hydrogen chloride until precipitation is complete. The mixture is filtered and the 2-[(4-actamido-3-chlorophenoxy)methyl]-2 - imidazoline hydrochloride product is collected as a filter cake.

The 2-[(4-acetamido-4-chlorophenoxy)methyl]-2-imidazoline hydrochloride is dissolved in 100 milliliters of aqueous 5 normal hydrochloric acid. The mixture is heated on a steam bath for about 2.5 hours, during which time a precipitate forms. The mixture is cooled and filtered. The filter cake is washed with aqueous 5 normal hydrochloric acid and dried. The 2-[(4-amino-3-chlorophenoxy)methyl]-2-imidazoline dihydrochloride product is found to melt at 285° C. The structure of the product is confirmed by infrared spectroscopy.

In substantially the same procedure described above and employing similar inert organic solvents, 2-[(4-amino-3-chlorophenoxy)methyl]-2-imidazoline dihydrobromide, having a molecular weight of 387.5, is prepared by substituting excess hydrobromic acid for hydrochloric acid in the procedure described above.

EXAMPLE 2

4 - acetamido-3,5 - dichlorophenoxyacetonitrile (22 grams; 0.10 mole) is mixed with ethylenediamine p-toluenesulfonate (23.5 grams; 0.10 mole) and 100 milliliters of 1,2-dichlorobenzene. Nitrogen is passed through the mixture while the mixture is heated at the boiling temperature under reflux for about 2 hours. The ammonia of reaction is collected by passing the exit gases through a gas scrubber containing dilute aqueous hydrochloric acid. The reaction mixture is cooled and filtered to obtain 2-[(4-acetamido-3-5-dichlorophenoxyl)-methyl]-2-imidazoline p-toluenesulfonate, having a molecular weight of 474.3, as a filter cake. The filter cake is mixed with water and the mixture is made basic by the addition of about 3.2 grams of sodium hydroxide in aqueous solution. The mixture is then extracted with methylene chloride and the organic layer is evaporated in vacuo to leave 2-[(4-acetamido-3,5-dichlorophenoxy)-methyl]-2-imidazoline, having a molecular weight of 302, as a residue. The 2[(4-acetamido-3,5-dichlorophenoxy)-methyl]-2-imidazoline is dissolved in about 100 milliliters of isopropyl alcohol and excess alcoholic hydrochloric acid is added until precipitation is complete. The mixture is filtered and the 2-[(4-acetamido-3,5-dichlorophenoxy)methyl] - 2 - imidazoline hydrochloride product is collected as a filter cake.

The 2-[(4-acetamido-3,5-dichlorophenoxy)methyl]-2-imidazoline hydrochloride is dissolved in about 100 milliliters of aqueous 5 normal hydrochloric acid. The mixture heated on a steam bath for about 2.5 hours. The mixture is cooled and filtered, and the filter cake is washed with aqueous hydrochloric acid and dried. The 2-[(4-amino-3,5-dichlorophenoxy)methyl]-2-imidazoline dihydrochloride product is found to melt at 232°–234° C.

In substantially the same procedure described above and employing similar inert organic solvents but substituting for the 4-acetamido-3,5-dichlorophenoxy-acetonitrile, an appropriate substituted phenoxyacetonitrile, the following halophenoxymethylimidazoline salts are formed.

2-[(4-amino-3,5-dibromophenoxy)methyl]-2 - imidazoline dihydrochloride, having a molecular weight of 21.9, is prepared by substituting 4-acetamido-3,5-dibromophenoxyacetonitrile for 4-acetamido-3,5-dichlorophenoxyacetonitrile in the above-described procedure.

2-[(4-amino-3,5-di-trifluoromethylphenoxy)methyl]- 2 - imidazoline dihydrochloride, having a molecular weight of 400, is perpared by substituting 4-acetamido-3,5-ditrifluoromethylphenoxyacetonitrile for the 4-acetamido-3,5-dichlorophenoxyacetonitrile in the above-described procedure.

EXAMPLE 3

4-acetamido-3-trifluoromethylphenoxyacetonitrile (21.9 grams; 0.1 mole) is mixed with ethylene-diamine p-toluenesulfonate (23.5 grams; 0.1 mole) and about 100 milliliters of 1,2-dichlorobenzene. Nitrogen gas is passed through the mixture while the mixture is heated at the boiling temperature under reflux for about 2 hours. The ammonia of reaction is collected by passing the exit gases through a gas scrubber containing dilute aqueous hydrochloric acid. The reaction mixture is cooled and filtered to obtain 2-[(4-acetamido-3-trifluoromethylphenoxy) methyl]-2-imidazoline p-toluenesulfonate, having a molecular weight of 473.3, as a filter cake. The filter cake is dissolved in water and the solution is made basic by the addition of about 20 milliliters of aqueous 5 normal sodium hydroxide. The mixture is extracted with methylene chloride and the extract is evaporated in vacuo to leave 2-[(4-acetamido-3-trifluoromethylphenoxy)methyl]-2-imidazoline, having a molecular weight of 301.1, as a residue. The residue is dissolved in about 100 milliliters of isopropanol and an isopropanol solution of hydrochloric acid is added until precipitation is complete. The mixture is filtered and the 2-[(4-acetamido-3-trifluoromethylphenoxy)methyl] - 2 - imidazoline hydrochloride product, having a molecular weight of 337.6, is collected as a filter cake.

The 2-[(4-acetamido-3-trifluoromethylphenoxy)methyl]-2-imidazoline hydrochloride is dissolved in about 100 milliliters of aqueous 5 normal hydrochloric acid. The mixture heated on a steam bath for about 2.5 hours. The mixture is cooled and aqueous sodium hydroxide is added to bring the pH of the resulting mixture to about 13. The mixture is extracted with methylene chloride and the methylene chloride extract is evapoarted in vacuo to leave the product as a residue. The 2-[(4-amino-3-trifluoromethylphenoxy)methyl]-2-imidazoline product is found to melt at 73°–75° C.

In substantially the same procedure described above and employing similar inert organic solvents, 2-[(4-amino-3-bromophenoxy)methyl]-2-imidazoline, having a molecular weight of 270, is prepared by substituting 4-acetamido-3-bromophenoxyacetonitrile for 4-acetamido-3-trifluoromethylphenoxyacetonitrile in the above-described procedure.

Antidepressant activity of the new compounds was indicated by reversal of reserpine-induced depression in mice. In representative operations, separate halo-phenoxymethylimidazoline compounds were administered to separate groups of mice at various dosage rates by intraperitoneal injection. One hour after the dose of the halophenoxymethylimidazoline compound, reserpine was administered to each mouse at a dosage rate of 5 milligrams per kilogram by intraperitoneal injection. The administration of 5 milligrams per kilogram of reserpine intraperitoneally to mice results in a progression of signs starting with drooping of the eyelids (ptosis) and pilo-eerction and culminating in a generalized depression with decreased spontaneous motor activity and decreased responsiveness to auditory or tactile stimuli.

Following the administration of the reserpine, the test animals were observed for the above signs of depression. A reversal of reserpine depression was indicated when the mice were observed to exhibit increased spontaneous motor activity and increased responsiveness to stimuli. The dosage of representative halophenoxymethylimidazoline compounds effective to reverse reserpine depression in 50 percent of the mice ($ED_{50}$) was calculated. 2-[(4-amino-3-chlorophenoxy)-methyl]-2-imidazoline dihydrochloride was found to have an $ED_{50}$ of 0.9 milligram per kilogram. 2-[4-amino - 3,5 - dichlorophenoxy)methyl]-2-imidazoline dihydrochloride was found to have an $ED_{50}$ of 2.5 milligrams per kilogram. The $ED_{50}$ for 2-[(4-amino-3-trifluoromethylphenoxy)-methyl] - 2 - imidazoline was found to be 18 milligrams per kilogram.

In other operations, 2-[(4-amino-3,5-dichlorophenoxy)methyl]-2-imidazoline dihydrochloride was found to block convulsions induced by Metrazol (pentylenetetrazol) in mice with an $ED_{50}$ of 2.75 milligrams per kilogram by intraperitoneal injection.

I claim:
1. A member of the group consisting of a compound corresponding to the formula

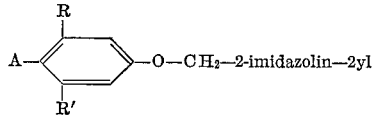

wherein A represents a member of the group consisting of acetamido and amino, R represents a member of the group consisting of chlorine, bromine and trifluoromethyl and R' represents a member of the group consisting of hydrogen, chlorine, bromine and trifluoromethyl, and a pharmaceutically-acceptable salt thereof.

2. A compound of claim 1 wherein R' is hydrogen.
3. A compound of claim 1 wherein the compound is 2-[(4-amino-3-chlorophenoxy)methyl]-2-imidazoline dihydrochloride.
4. The compound of claim 1 wherein the compound is 2[(4-amino - 3 - chlorophenoxy)methyl]-2-imidazoline.
5. The compound of claim 1 wherein the compound is 2-[(4-acetamido - 3 - chlorophenoxy)methyl]-2-imidazoline.
6. The compound of claim 1 wherein the compound is 2-[(4-amino - 3,5 - dichlorophenoxy)methyl]-2-imidazoline dihydrochloride.
7. The compound of claim 1 wherein the compound is 2-[(4 - amino-3-trifluoromethylphenoxy)methyl]-2-imidazoline.

References Cited
UNITED STATES PATENTS 2,505,247  4/1950  Isler _____ 260—309.6

FOREIGN PATENTS 204,726  8/1939  Switzerland.
204,742  8/1939  Switzerland.

JOHN D. RANDOLPH, *Primary Examiner.*

N. TROUSOF, *Assistant Examiner.*

U.S. Cl. X.R.

260—465, 999